United States Patent [19]
Tsukamoto et al.

[11] 3,891,307
[45] June 24, 1975

[54] PHASE CONTROL OF THE VOLTAGES APPLIED TO OPPOSITE ELECTRODES FOR A CHOLESTERIC TO NEMATIC PHASE TRANSITION DISPLAY

[75] Inventors: Masahide Tsukamoto; Tetsuro Ohtsuka, both of Osaka, Japan

[73] Assignee: Matsushita Electric Industrial Co., Ltd., Osaka, Japan

[22] Filed: Mar. 12, 1974

[21] Appl. No.: 450,450

[30] Foreign Application Priority Data
Mar. 20, 1973  Japan.............................. 43-32308
Apr. 20, 1973  Japan.............................. 48-45332

[52] U.S. Cl....................... 350/160 LC; 340/324 R
[51] Int. Cl............................................... G02f 1/16
[58] Field of Search............ 350/160 LC; 340/324 R

[56] References Cited
UNITED STATES PATENTS
| | | | |
|---|---|---|---|
| 3,512,876 | 5/1970 | Menks................................ | 350/267 |
| 3,740,717 | 6/1973 | Heuner et al................. | 350/160 LC |
| 3,806,230 | 4/1974 | Haas............................ | 350/160 LC |
| 3,809,458 | 5/1974 | Heuner et al................. | 350/160 LC |

Primary Examiner—Edward S. Bauer
Attorney, Agent, or Firm—Wenderoth, Lind & Ponack

[57] ABSTRACT

An electro-optical device employing liquid crystal cell, which consists of a first electrode and a second electrode opposed to the first electrode, at least one of which being light-transparent, and a liquid crystal sandwiched between the first and second electrodes, is driven by voltage pulses with special wave form and changes in its optical transmission or reflection. The liquid crystal is cholesteric liquid crystal having positive dielectric anisotropy. A first circuit connected to the first electrode generates a.c. voltage pulse having phase $\phi_1$ for time duration $T_1$ and a d.c. bias voltage of the same amplitude as that of the a.c. voltage pulse. A second circuit connected to the second electrode generates a.c. voltage having the same amplitude, the same bias as that of the a.c. voltage pulse and phase $\phi_1$ switchable to another phase $\phi_2$ for time interval $T_2$ which is varied with the change of a signal such as image signal. This technique is extended to an X-Y matrix display device which has plural display elements formed at intersections of plural X-electrodes and plural Y-electrodes opposing to and crossing the X-electrodes with a gap.

9 Claims, 13 Drawing Figures

PHASE CONTROL OF THE VOLTAGES APPLIED TO OPPOSITE ELECTRODES FOR A CHOLESTERIC TO NEMATIC PHASE TRANSITION DISPLAY

BACKGROUND OF THE INVENTION

This invention relates to a flicker-free and highcontrast electro-optical devices using liquid crystal. Recently, electro-optical devices using liquid crystal are used in some fields of display, e.g., digital read out of volt-meters, clock, portable calculator, etc. However, these devices can display only a few or several digits. The reason for the limitation comes from the troublesome wiring between display segment electrodes and driver-circuits. Even in 8-digit display device, each digits being composed of 7 display segments, 56 wiring between the display segments and the driver-circuits and one wiring between one common electrode and one driver circuit are necessary.

Liquid crystal display devices with much more display elements (or segments), which can be fabricated without such troublesome wiring, are strongly desired. The well-known X-Y matrix display devices are suitable for this purpose, wherein $m \times n$ display elements are formed at the intersections of $m$ X-electrodes and $n$ Y-electrodes. In such X-Y matrix dispaly devices, the display elements (or segments) are driven sequentially, i.e. operated by pulses, using addressing method or scanning method. However, there is a big problem which should be solved for obtaining clear image by the X-Y matrix display method. This is called "cross effects", that is a phenomena of undesirable half excitation of display elements which occurs on the selected X-electrode and Y-electrode, except for full excitation of the display element at the intersection of the X and Y-electrodes, when one selected X-electrode and one selected Y-electrode are energized. Liquid crystals having threshold voltage are used for preventing the cross effect. Such liquid crystal shows optical change in transmission or reflection when a voltage above the threshold voltage is applied to the liquid crystal. However, there is still another problem that rapid response of scattered light to applied voltage are required for flicker-free and light contrast display, since pulse operation or scanning is employed in the X-Y matrix display. In addition to the problem as mentioned above, it is required for liquid crystal to be operated by a.c. voltage for prolonging the life time.

For solving these problem, there have been proposed several methods as that of connecting a diode to each of display element (Bernard J. Lechner et al., Proc. IEEE, 59, 1566–1579, (1971)), that of laminating a layer of ferro-electric material on the liquid crystal layer (J. G. Grabmaier, et al., Mol. Cryst. Liq. Cryst., 15, 95–104 (1971)), or that of superposing an a.c. voltage of high frequency on an excitation voltage of low frequency (C. R. Stein et al. Appl. Phys. Letters, 19, 343–345, (1973)). However, the prior methods are not enough for the practical use because of difficulty for fabrication, slow turn-on, slow turn-off, flicker, or low contrast. Further, the a.c. operation for long lifetime makes it more difficult to realize the X-Y matrix liquid crystal display device. Although there is another prior art, U.S. Pat. 3,653,745, disclosing the display device, the method thereof does not relate to a X-Y matrix display device, but to display device which has independent display elements driven by driver-circuits connected to respective display elements. So, it can't be applied to X-Y matrix display devices.

SUMMARY OF THE INVENTION

Therefore, an object of the present invention is to provide a novel and improved electro-optical device using liquid crystal.

Another object of the present invention is to provide an improved electro-optical device using liquid crystal, in which the conventional defects as cross effect, slow response, flicker and low contrast can be solved.

Further object of the present invention is to provide an improved electro-optical X-Y matrix display device which can be fabricated easily and has a long lifetime because of a.c. operation.

These objects are achieved by providing the electro-optical display device according to the present invention, which comprises (1) a liquid crystal cell having a first electrode and a second electrode for applying a voltage to a liquid crystal layer between said first and said second electrodes and having a threshold voltage Vth above which its optical transmission changes, at least one of said first and second electrodes being light-transparent, said liquid crystal being cholesteric liquid crystal having positive dielectric anisotropy and consisting of nematic liquid crystal of 30 to 99 weight % having positive dielectric anisotropy and a compound of 70 to 1 weight % selected from steroidal compounds and optically active compounds; and (2) a means for changing optical transmission of said liquid crystal cell, comprising; (a) a first circuit connected to said first electrode which generates a.c. voltage pulse having amplitude V, frequency $f$, phase $\phi_1$ time duration $T_1$ and d.c. bias voltage of the same amplitude as that of said a.c. voltage pulse, said amplitude V being higher than a half of said threshold voltage Vth and equal to or lower than said threshold voltage Vth, said frequency $f$ being within a range from 10 Hz to 1 KHz, and (b) a second cirsuit connected to said second electrode which generates an a.c. voltage having the same amplitude V, the same frequency $f$, the same bias voltage as those of said a.c. voltage pulse, respectively and phase $\phi_1$ switchable to another phase $\phi_2$ for time interval $T_2$, said time interval $T_2$ being varied from O to $T_1$ for changing the optical transmission, whereby, an a.c. bias resulted from the difference between said d.c. bias voltage generated by said first circuit and said a.c. voltage generated by said second circuit keeps an excited light-transparent state of said liquid crystal cell and reduces flicker.

BRIEF DESCRIPTION OF THE DRAWINGS

These and other objects and features and advantages of the present invention will become apparent from consideration of the following detailed description taken together with the accompanying drawings, in which:

FIG. 3 shows graphs showing $a$ an a.c. pulse applied to the first electrode, $b$ an a.c. voltage applied to the second electrode and $c$ an a.c. voltage applied across liquid crystal layer.

FIG. 7 shows graphs showing a a.c. pulses generated by X-drivers, (b) a.c. voltages generated by Y-drivers and c a.c. voltages applied to display elements.

DETAILED DESCRIPTION OF THE INVENTION

Figure 1:
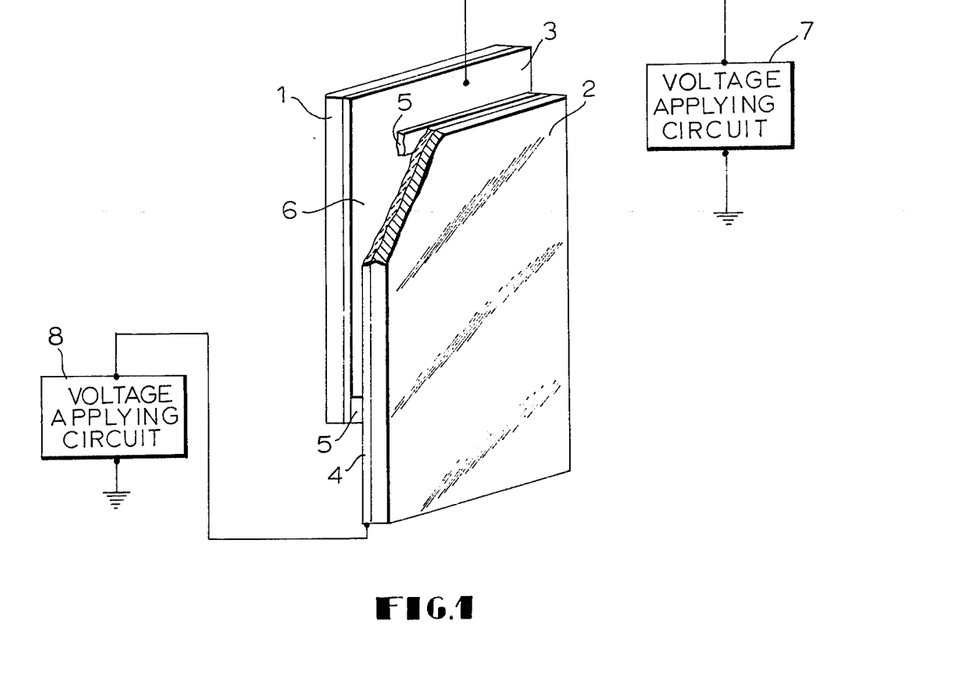
FIG. 1 is a perspective view of a liquid crystal cell.

FIG. 1 shows a typical liquid crystal cell of light-transmissive type. Referring to FIG. 1, a first transparent electrode 3 on a first transparent substrate 1 opposes to a second transparent electrode 4 on a second transparent substrate 2 with a gap held by spacers 5. The gap is filled with a liquid crystal. For the first and second transparent substrates 1, 2, usually glass and plastics are used. The first and second transparent electrodes 3, 4 are usually made of films of indium oxide ($In_2O_3$) or tin-oxide ($SnO_2$). But other electrically conducting films, such as films of gold, silver and aluminum, may be used so long as they are electrically conductive and enough thin to transmit light. The spacers 5 are usually plastic sheets. The distance between the first and the second electrodes is usually arranged to be from a few micrometer to a few tens micrometer. The liquid crystal between the first and second electrodes is a cholesteric liquid crystal having positive dielectric anisotropy. Details on the liquid crystal will be described hereinafter. The liquid crystal layer 6 is subjected to an electric field produced by the voltage difference between the first and the second electrodes 3, 4. The voltages applied to the first and second circuits 7, 8 connected to the respective electrodes.

Although FIG. 1 shows only a transmissive type of a liquid crystal cell, a reflective type can be obtained by making either the first or the second electrode light-reflective. In this case, observer has to see the cell from the side of the transparent electrode.

Figure 2:
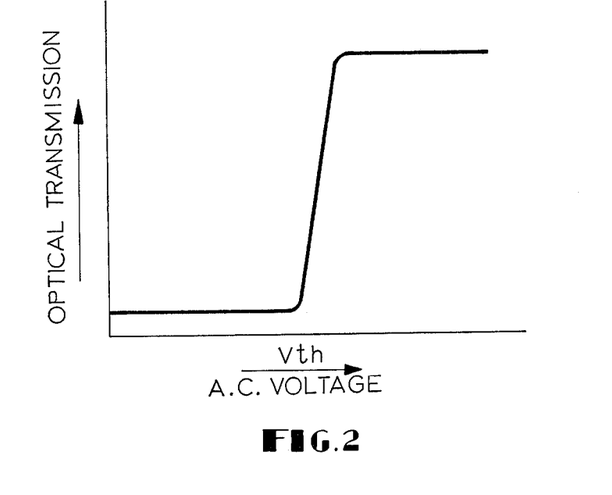
FIG. 2 is a graph showing the relationship between amplitude of a.c. voltage and optical transmission of the liquid crystal cell used in the present invention.

The electro-optical property of the liquid crystal cell shown in FIG. 1 is illustrated in FIG. 2 qualitatively. Referring to FIG. 2, the horizontal axis represents amplitude of a.c. voltage applied between the first and second electrode, and vertical axis represents optical transmission of the liquid crystal cell. The liquid crystal cell doesn't change optically until the amplitude of the applied a.c. voltage exceeds the threshold voltage Vth. When the amplitude of the a.c. voltage goes up exceeding the threshold voltage Vth, the optical transmission begins to increase and saturetes at last. The threshold voltage changes with the change of the waveform of the a.c. voltage, frequency, distance between the first and second electrodes and temperature. The change of the optical transmission shown in FIG. 2 is known as electrically induced cholesteric to nematic phase transition.

Figure 3A:
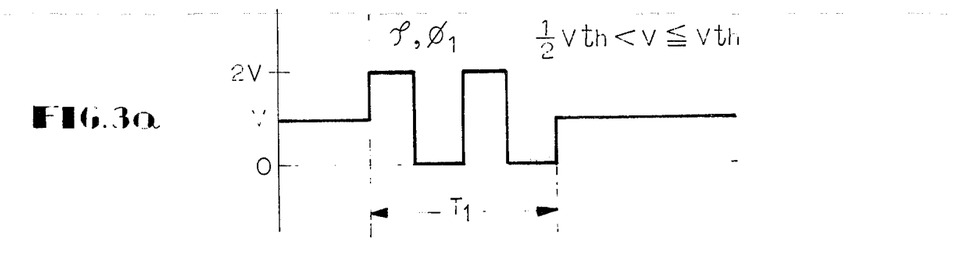
Figure 3B:
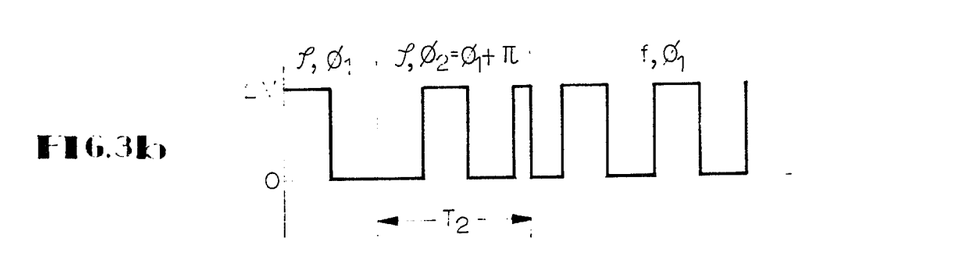
Figure 3C:
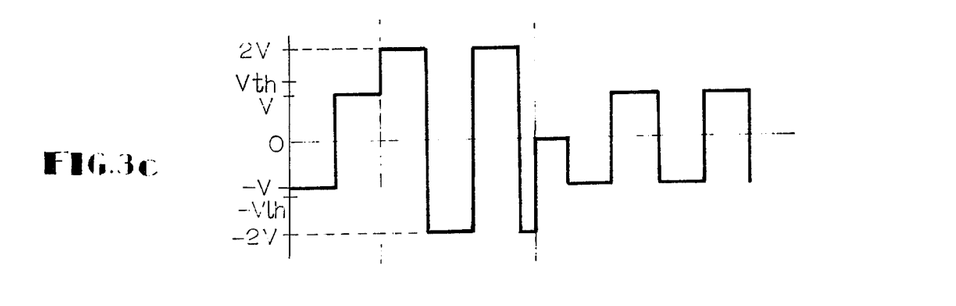

FIG. 3 shows typical waveforms of voltage used in the present invention. Referring to FIG. 3, the graph a shows a waveform or voltage which is applied to the first electrode 3 and generated by the first circuit 7. The graphs b show a waveform of voltage which is applied to the second electrode 4 and generated by the second circuit 8. As shown in graph a, the voltage generated by the first circuit 7 is an a.c. voltage pulse having a frequency $f$, a phase $\phi_1$ a duration $T_1$, an amplitude V and a d.c. bias having voltage V. Here, the amplitude V is set to be equals to or less than the threshold voltage Vth shown in FIG. 1 and higher than the half of the threshold voltage Vth. The graph b shows an example of a waveform of a voltage generated by the second circuit 8. The waveform is controlled by signal such as image signal for changing the optical transmission of the liquid crystal cell. In the case of the graph b, the a.c. voltage having a frequency $f$, the phase $\phi_1$, an amplitude V, and a bias V, changes to an a.c. voltage having a frequency $f$, an amplitude V, a bias V and a phase $\phi_2(=\phi_1+\pi)$ for time interval $T_2$. The time interval $T_2$ is changed within the range from O to $T_1$ with the change in the image signal. The graph c shows the voltage difference between the first and second electrodes, i.e. a difference between the voltages shown by the graphs a and b. For the time interval $T_2$, an a.c. voltage of amplitude 2V is applied to the liquid crystal layer and for the other time period, an a.c. voltage of amplitude V is applied to it. Although in FIG. 3 only one a.c. pulse is shown, usually this a.c. pulse is repeated.

Figure 4A:
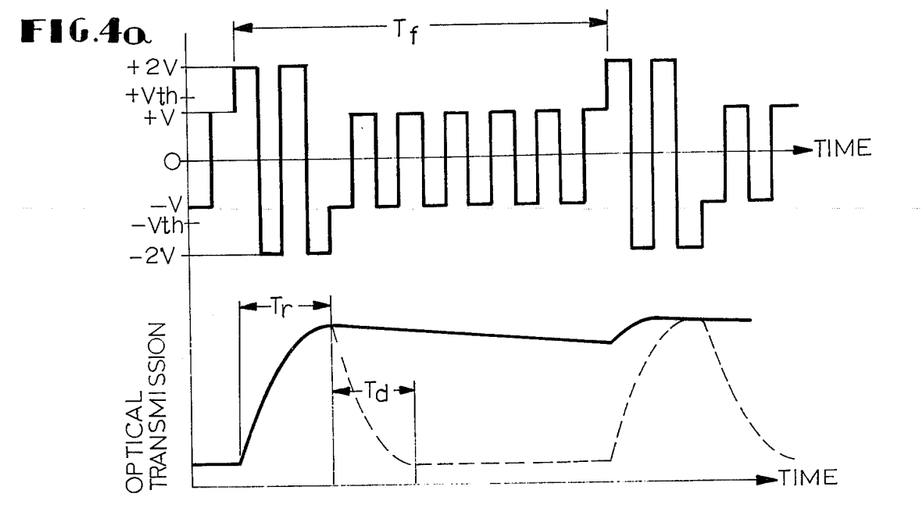
FIG. 4a and FIG. 4b show graphs showing voltages applied to liquid crystal layer and respective optical transmission.
Figure 4B:
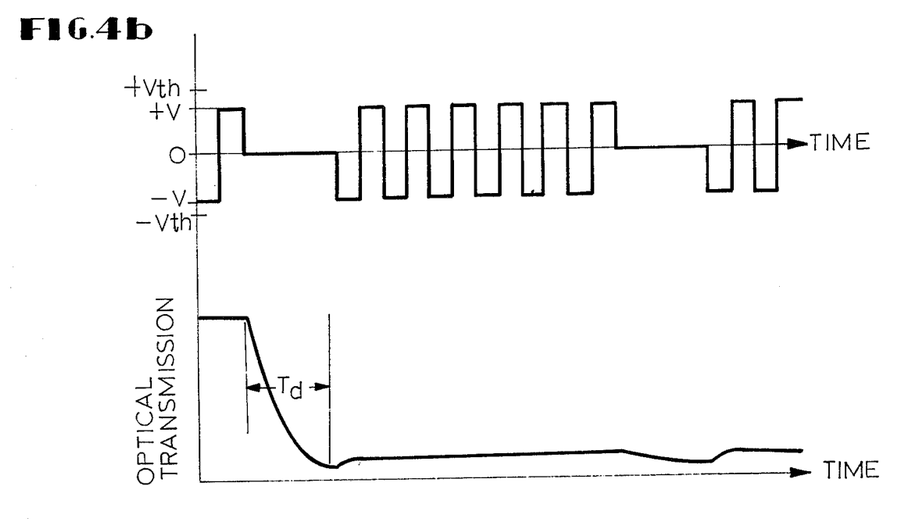

FIG. 4 shows the optical behaviors of the liquid crystal cell shown in FIG. 1 when the time interval $T_2$ is $T_1$ or O.

When the time interval $T_2$ equals to $T_1$, the voltage applied to the liquid crystal layer and the optical transmission for the liquid crystal cell are given by the graphs a. The liquid crystal layer is excited by the a.c. voltage of amplitude 2V which exceeds the threshold voltage Vth, and the layer becomes light-transparent with a rise time tr. After that excitation, the highly optically transmissive state of the liquid crystal layer is kept by the a.c. bias following the excitation as shown by the solid line in FIG. 4 a. Then, there is no flicker, if $T_f$, the frametime shown in FIG. 4 becomes long. If the a.c. bias is absent, the optical transmission decays rapidly with a decay time td as the graph drawn by the dotted line. This is understood from FIG. 5.

Figure 5:
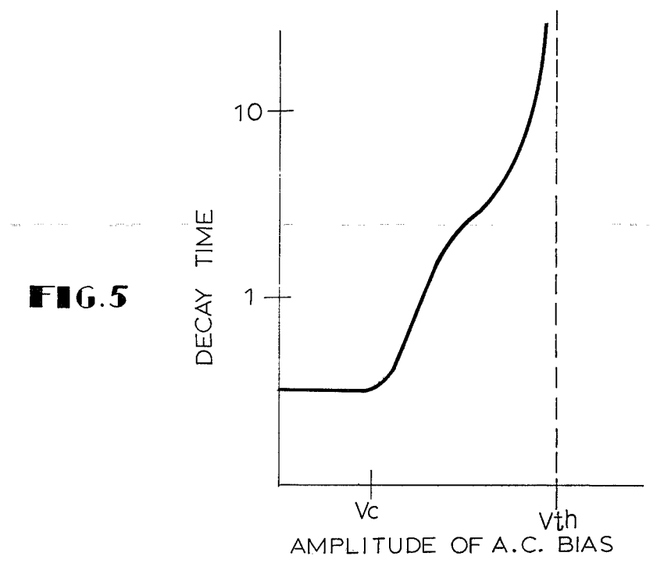
FIG. 5 is a graph of the relationship between amplitude of a.c. bias and decay time.

FIG. 5 shows a relationship between the amplitude of the bias a.c. voltage and the decay time which is a time required for the light transmissive state or the liquid crystal cell to return to the state of the minimum light transmission. When the amplitude of the a.c. bias increases exceeding a critical voltage $V_c$, the decay time increases rapidly till the amplitude of the a.c. bias reaches the threshold voltage Vth. This is a characteristic of the liquid crystal used in the present invention. Details on the liquid crystal will be described hereinafter. Therefore, the amplitude of the a.c. bias shown by the graph a in FIG. 4 has to be larger than the critical voltage $V_c$ for obtaining a flicker-free device. However, since the critical voltage $V_c$ is less than a half of the threshold voltage Vth, the limitation, ½Vth<V ≦ Vth, for the amplitude V of the a.c. bias does not change. Again referring to FIG. 4, the graph b shows the voltage applied to the liquid crystal cell when the time interval $T_2$ equals to zero. Since in this case there is no excitation pulse amplitude of which exceeds Vth and the amplitude of the a.c. bias becomes zero, the lighly optical transmission decreases rapidly with a decay time td. After that, the optical transmission is kept at low level. Since the decay time td of the liquid crystal used in the present invention is very short without the bias, rapid change of the optical transmission can be obtained. If the time interval $T_2$ is between O and $T_1$ except O and $T_1$, a half excitation is obtained, and then half tone can be obtained. As understood from the graphs $a$ and $b$ in FIG. 4, no flicker and high contrast (the ratio of the amount of the transmitted light of the liquid crystal cell in the excited state to that in the unexcited opaque state) can be obtained. Although in FIG. 3 and FIG. 4 a rectangular waveform is used, other waveform such as sinusoidal waveform and triangle waveform may be used. And although in FIG. 3 it is illustrated that the phase $\phi_2$ of the graph $b$ equals to $(\phi_1+\pi)$, the phase $\phi_2$ may be another phase between $\phi_1$ and $\phi_1+\pi$.

Figure 6:
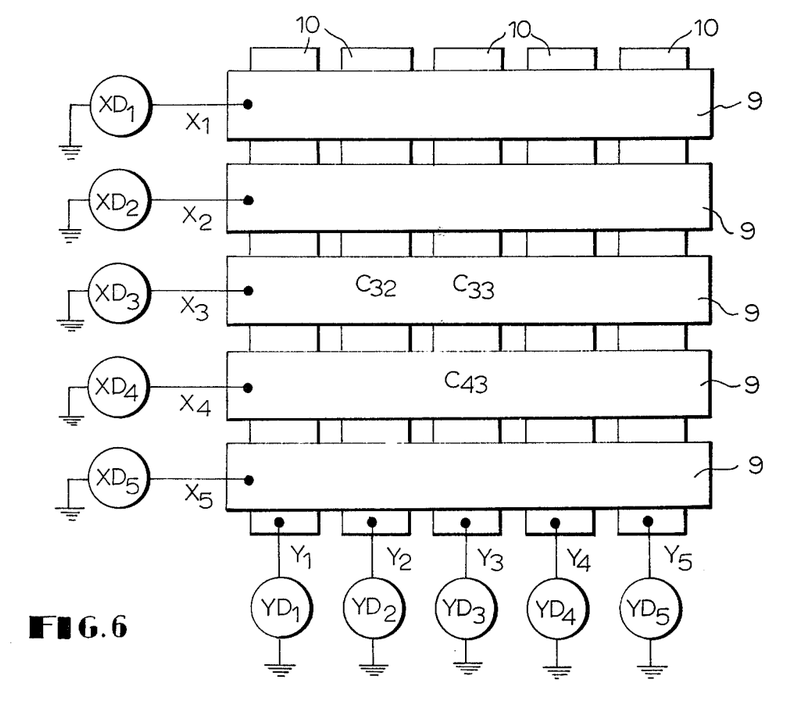
FIG. 6 is a schematic drawings of an X-Y matrix display device.
Figure 7A:
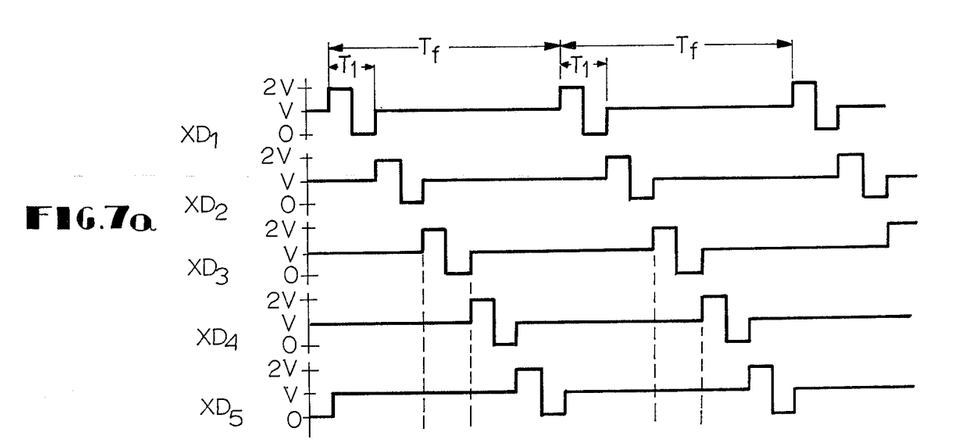

Hereinafter, the above mentioned explanation on a liquid crystal device having one display element is extended to an a X-Y matrix display device having much larger number of display elements. In FIG. 6, a typical X-Y matrix display device is drawn schematically. Referring to FIG. 6, although, as a matter of cource, the X-and Y-electrodes are supported by substrates and a liquid crystal layer is sandwitched between them, the substrates and the liquid crystal layer are not shown for simplification. The five X-electrodes 9 and the five Y-electrodes 10 make 25 display elements such as $C_{32}$, $C_{33}$, $C_{43}$, at the intersections thereof. Each electrode is energized by the X-driver $XD_1 \ldots XD_5$ and the Y-drivers $YD_1 \ldots YD_5$, respectively. The X-Y matrix display device shown in FIG. 6 operates as follows. Each of the X-drivers generates a.c. pulses as shown in FIG. 7$a$, in which only one cycle of a.c. voltage is interposed differently form that in FIG. 3$a$. The amplitude V equals to or lower than the threshold voltage Vth and higher than a half of the threshold voltage, as described hereinbefore referring FIG. 3.

Figure 7B:
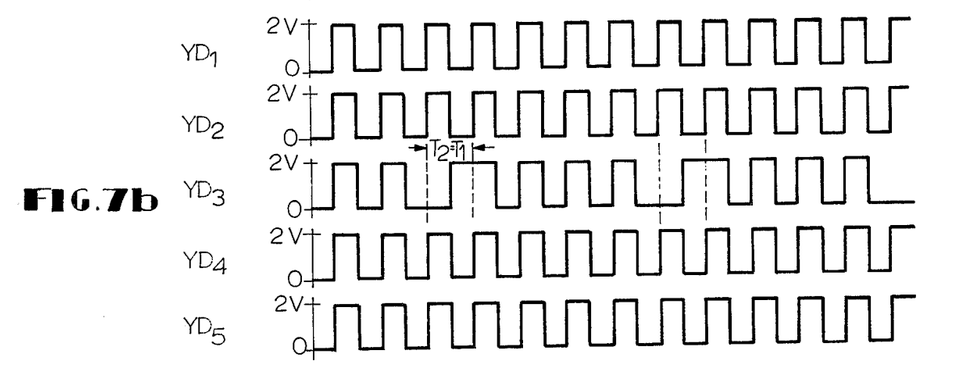
Figure 7C:
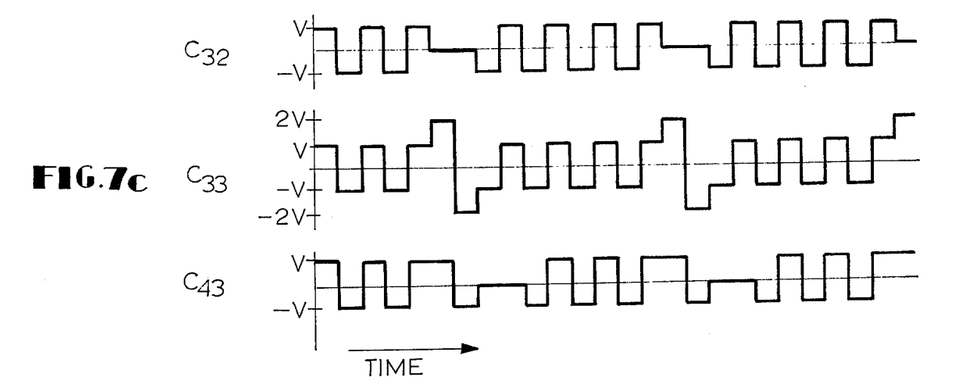

Each of the Y-drivers generates a.c. voltage as shown in FIG. 7$b$, in which the phase is switched to another phase for time interval $T_2$ which is varied corresponding to an image signal. In FIG. 7$b$, only $YD_3$ driver changes the phase of the a.c. voltage for time interval $T_2(=T_1)$ when the $XD_3$ driver energizes the $X_3$-electrodes. The resultant voltages applied to the display elements, e.g. $C_{32}$, $C_{33}$, $C_{43}$ are shown in FIG. 7$c$. Only the display element $C_{33}$ is excited by a.c. pulses having a voltage which excesses the threshold voltage Vth. Then, it becomes light transparent. Since, the display elements $C_{32}$ and $C_{43}$ are not subjected to such high voltage, they remain as opaque. Voltages applied to the display elements other than $C_{32}$, $C_{33}$, $C_{43}$ can be obtained by subtracting one of the outputs of the Y-drivers showing in FIG. 7$b$ from one of the outputs of the X-drivers shown in FIG. 7$a$. All of the voltages obtained by such a manner doesn't exceed the threshold voltage. Then all display elements are in the opaque state except for the display element $C_{33}$ in the case shown in FIG. 7. Here, the a.c. bias which is applied to each of the display element has an important role to reduce flicker and to increase the contrast, as described hereinbefore referring FIG. 4. If the time interval $T_2$ is controlled in the similar manner and then the transparency of each display element are controlled, there is obtained an image with half tone.

Figure 8:
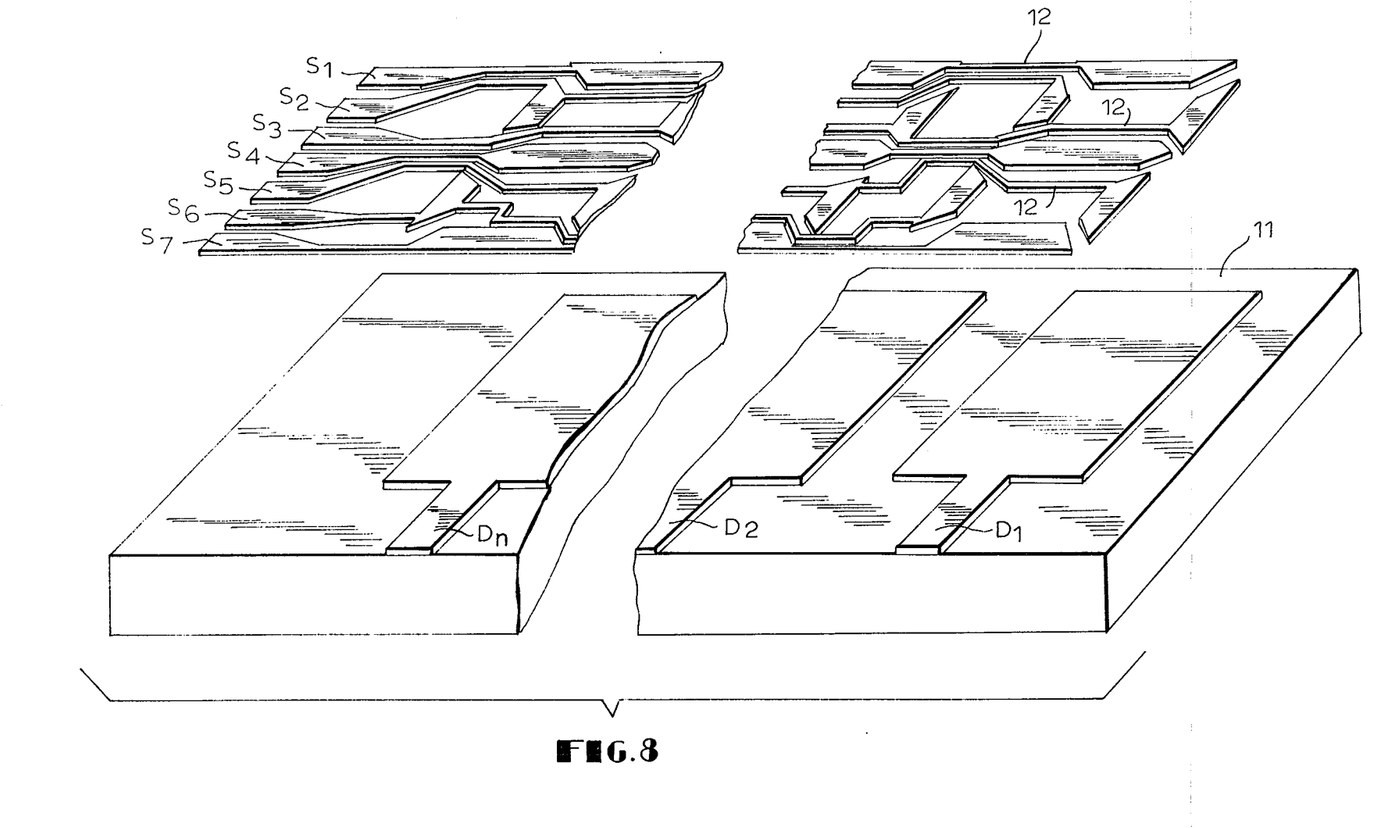
FIG. 8 shows a modulated X-Y display panel in which electrodes have special shapes.

The shape of the X- and Y- electrodes shown in FIG. 6 may be modulated to form seven-segment numerics as shown in FIG. 8. Referring to FIG. 8, for easy understanding, only electrodes are shown, and a substrate which supports segment-electrodes $S_1$ to $S_7$ is not shown. Also the panel is partially cut away and the distance between the segment electrodes and digit electrodes $D_1, D_2 \ldots D_n$ on a substrate 11 are enlarged in the figure. Overlapped parts of the segment electrodes and the digit electrode act as display elements or display segment. It is preferable that the lead such as the parts designated by the numeral 12 is so thin that observer can't distinguish them.

The liquid crystals used in the present invention are cholesteric liquid crystals having positive dielectric anisotropy, and they exhibit cholesteric to nemetic phase transition when an electric field above a threshold field is applied thereto. This structure change induced by electric field can be observed as change of optical transmission shown in FIG. 2. The cholesteric liquid crystals are mixtures which essentially consist of nematic liquid crystals having positive dielectric anisotropy and an organic compound having twisting power. Here, twisting power means an ability for constructing cholesteric structure when the organic compound is mixed with nematic liquid crystal. Nematic liquid crystal having positive dielectric anisotropy is an organic compound having its molecular dipole moment parallel to its long molecular axis. Hereinafter, nematic liquid crystal having positive dielectric anisotropy is designated as p-nematic liquid crystal. Typical compounds which represent p-nematic liquid crystals include p-alkoxybenziliden-p'-cyanoaniline, p-alkylbenzylidene-p'-cyanoaniline, p-cyanobenzylidene-p'-alkylaniline, p-acyloxybenzilidene-p'-cyanoaniline, p-cyanobenzilidene-p'-acyloxyaniline, p-cyanophenyl-p'-alkyl-benzoate, p-cyanophenyl-p'-alkoxybenzoate, p-alkylphenyl-p'-cyanobenzoate, p-alkoxyphenyl-p'-cyanobenzoate, p-alkoxybenzylidene-p'-aminoazobenzene, n-alkyl-p-cyanobenzylidene-p'-aminocinnamate, p-n-alkyl-p'-n-alkylazobenzene, p-alkyl-p'-cyanobiphenyl.

A mixture of two or three or more compounds among the above p-nematic liquid crystals is also p-nematic liquid crystal and then may be employed. It is known that a mixture of a p-nematic liquid crystal and a nematic liquid crystal having negative dielectric anisotropy is a p-nematic liquid crystal so long as the average dielectric constant parallel to the long molecular axis is larger than that perpendicular to the axis. And a mixture of plural p-nematic liquid crystals and plural n-nematic liquid crystals (nematic liquid crystals having negative dielectric anisotopy) may be employed as p-nematic liquid crystal. Typical compounds which represent n-nematic liquid crystals include p-alkoxy-p'-n-alkylazoxybenzene, p-n-alkyl-p'-alkoxyazoxybenzene, p-alkoxy-p'-alkoxyazoxybenzene, p-n-alkyl-p'-alkoxyazobenzene, p-alkoxy-p'-alkylazobenzene, p-alkoxy-p'-alkoxyazobenzene, p-alkoxybenzylidene-p'-acyloxyaniline, p-n-alkylbenzilidene-p'-acyloxyaniline, p-n-alkylbenzilidene-p'-alkoxyaniline, p-alkoxybenzylidene-p'-n-alkylaniline, p-n-alkyl-p'-acyloxyazoxybenzene.

The organic compounds having twisting power consist of steroidal compounds and some optically active compounds. The typical steroidal compounds include cholesterin derivatives such as cholesteryl chloride, cholesteryl bromide, cholesteryl acetate, cholesterylbutyrate, cholesteryl heptanoate, cholesteryl nonanoate, cholesteryl oleate, cholesteryl oleyl carbonate cholesteryl 2-(ethoxy-ethoxy) ethyl carbonate. The Optically active compounds, which show cholesteric phase when they are mixed with nematic liquid crystal, include (+) p-ethoxybenzylide-p'-(2-methyl butyl) aniline, (+) p-methoxybenzylidene-p'-(2-methyl butyl) aniline, (+) amyl-p-(cyanobenzilideneamino) cinnamate, (+) p,p'-(2-methylbutoxy) azoxybenzene. Hereinafter, these compounds are denoted as optically active compounds. The amount of the steroidal compound or optically active compound which is mixed with nematic liquid crystal is very important for obtaining the electro-optical properties as shown in FIG. 2 and FIG. 5. A cholesteric liquid crystal which includes a steroidal compound or optically active compound of more than 1 weight % has the electro-optical properties as shown in FIG. 2. When concentration of the steroidal compound or optically active compound increases, the threshold voltage Vth increases. Most of cholesteric liquid crystals which includes more than 70% of a steroidal compound or optically active compounds have higher threshold voltages which exceeds a breakdown voltage of the liquid crystal layer.

A cholesteric liquid crystal which is mixture of a p-nematic liquid crystal (88 weight % of p-hexylbenzyliden-p'-cyanoaniline) and a cholesteric liquid crystal (12% of cholesteric nonanoate) has positive dielectric anisotropy and has the electro-optical properties shown in FIG. 2 and FIG. 5. The threshold voltage Vth is 20 volts at room temperature 23°C when the frequency of applied a.c. voltage is 250 Hz, the waveform is rectangular and the thickness of the liquid crystal layer is 6μ. The rise time is 10 msec when the amplitude of the a.c. excitation pulse is 40 volts. The decay time is prolonged by an a.c. bias. When an a.c. bias of 19 volts is applied to the liquid crystal cell decay time of more than 3 minutes can be obtained. Then, there is only a few percent decrease of the optical transmission for 300 msec after removal of an a.c. excitation pulse. There is obtained a long frame time $T_f$ of 300 msec, when the amplitude V of the a.c. pulse and the a.c. voltage shown in FIG. 3 is 19 volts. If a duration $T_1$ of an a.c. pulse is set at 10 msec (which is the rise time), an X-Y matrix display device with 30 X-electrodes can be obtained. It is preferable that the frequency $f$ of the a.c. pulse and the a.c. voltage is prefer to be within the range from 10 Hz to 10 KHz, because life time of the liquid crystal is shortened with an a.c. voltage of a frequency below 10 Hz and the decay time becomes short with an a.c. bias of a frequency above 10 KHz.

A cholesteric liquid crystal which is a mixture of next compounds also has the electro-optical properties shown in FIG. 2. and FIG. 5:
  p-nematic liquid crystal;
  p-n-butoxybenzylidene-p'-cyanoaniline 27 weight %
  p-n-octoxybenzylidene-p'-cyanoaniline 18 weight %
    n-nematic liquid crystal;
  p-methoxybenzilidene-p'-n-butylaniline 48 weight %
    cholesterin derivative
  cholesteryl oleyl carbonate 7 weight %
This cholesteric liquid crystal has a threshold voltage 10 volts at room temperature 23°C, when the liquid crystal layer is 6μ, the frequency of the applied a.c. voltage is 100 Hz and the waveform is rectangular. Rise time $tr$ is 60 msec when the amplitude of the a.c. excitation pulse is 20 vols. Decay time $td$ is longer than 10 minutes with an a.c. bias of 9.5 volts. A few percent decreasing of the optical transmission requires about 2 minutes. On similar consideretion to that or the previous example, there is obtained an X-Y matrix display having 30 ($\approx$ 2000/60) X-electrodes again, although the frametime $T_f$ is longer than that of the previous example.

A cholesteric liquid crystal which is a mixture of next compounds has also the electro-optical properties as shown in FIG. 2 and FIG. 5:
  p-namatic liquid crystal;
  p-n-pentyl benzilidene-p'-cyanoaniline 30 weight %
    n-nematic liquid crystal;
  p-methoxy-p'-butylazoxybenzene 46 weight % optically active compound;
  p-ethoxy benzilidene-p'-(2-methyl-butyl) aniline 24 weight % This cholesteric liquid crystal has a threshold voltage Vth of 20 volts at room temperature 23°C, when the frequency of an applied a.c. voltage is 250 Hz, the waveform is rectangular and the thickness of the liquid crystal layer is 6μ. The rise time $tr$ is 7 msec when the amplitude of an a.c. excitation pulse is 40 volts, and the decay time $td$ is 2 minutes with an a.c. bias of 19 volts. Optical transmission of the liquid crystal cell decreases by only a few-percent for 150 msec. Then, an X-Y matrix display device with 21 ($\approx$150/7) X-electrodes can be obtained.

In these example, there is obtained a X-Y matrix display devoces which has about 900 display clements (30 X-electrodes × 30 Y-electrodes). However there is a little flicker caused by the ripple shown in FIG. 4b (the ripple of optical transmission of an opaque state). For reducing the flicker, the number of the X-electrodes as mentioned above may be reduced. For an example, in the last example one can obtain an X-Y matrix display which is completely fricker-free and has a high contrast of about 15, when the X-electrodes are reduced to 10.

As described hereinbefore, the present invention provides an electro-optical device which promises an X-Y matrix display device with advanced performance such as flicker-free, high contrast and no cross effect with advantage of easy fabricaiton.

What we claim is:
1. An electro-optical device comprising:
  1. a liquid crystal cell having a first electrode and a second electrode for appling a voltage ot a liquid crystal layer between said first and said second electrodes and having a threshold voltage Vth above which its optical transmission changes, at least one of said first and second electrodes being light-transparent, said liquid crystal being cholesteric liquid crystal having positive dielectric anisotropy and consisting of nematic liquid crystal of 30 to 99 weight % having positive dielectric anisotropy and a compound of 70 to 1 weight % selected from steroidal compounds and optically active compounds; and
  2. a means for changing optical transmission of said liquid crystal cell, comprising;
    a. a first circuit connected to said first electrode which generates a.c. voltage pulse having amplitude v, frequency $f$, phase $\phi_1$ time duration $T_1$ and d.c. bias voltage of the same amplitude as that of said a.c. voltage pulse, said amplitude V being higher than a half of said threshold voltage Vth and equal to or lower than said threshold voltage Vth, said frequency $f$ being within a range from 10 Hz to 1 KHz, and
    b. a second circuit connected to said second electrode which generates an a.c. voltage having the same amplitude V, the same frequency $f$, the same bias voltage as those of said a.c. voltage pulse, respectively and phase $\phi_1$ switchable to another phase $\phi_2$ for time interval $T_2$, said time in- terval $T_2$ being varied from O to $T_1$ for changing the optical transmission, whereby, an a.c. bias resulted from the difference between said d.c. bias voltage generated by said first circuit and said a.c. voltage generated by said second circuit keeps an excited light-transparent state of said liquid crystal cell and reduces fliker.

2. An electro-optical device as claimed in claim 1, wherein the phase difference $\phi_1-\phi_2$ between said phase $\phi_1$ and said $\phi_2$ is set to be $\pm\pi$ 3. An electro-optical device as claimed in claim 1, wherein said nematic liquid crystal having positive dielectric anisotropy consists of only nematic liquid crystal compounds having positive dielectric anisotropy.

4. An electro-optical device as claimed in claim 1, wherein said nematic liquid crystal having positive dielectric anisotropy consists of a nematic liquid crystal compound having positive dielectric anisotropy and a nematic liquid crystal compound having negative dielectric anisotropy.

5. An electro-optical device comprising:
1. an X-Y matrix display panel having a plurality of X-electrodes formed on one substrate, a plurality of Y-electrodes formed on another substrate, said Y-electrodes crossing and oposing to said X-electrodes with a gap so as to form a plurality of display elements at each of the intersections thereof and a liquid crystal filling said gap and having a threshold voltage Vth above which its optical transmission changes, at least one of said substrates including said X-electrodes and said Y-electrodes being light-transparent, and said liquid crystal being cholesteric liquid crystal consisting of nemetic liquid crystal of 30 to 99 weight % having positive dielectric anisotropy and a compound of 70 to 1 weight % selected from steroidal compounds and optically active compounds; and
2. a means for producing an image changing optical transmission of each of said display elements comprising;

a. a plurality of X-drivers connected to said x-electrodes, respectively, each of which generates a.c. voltage pulse of amplitude V, frequency $f$, phase $\phi_1$ and time interval $T_1$ and a d.c. bias voltage of the same amplitude V as that of said a.c. voltage pulse said amplitude V being higher than a half of said threshold voltage Vth and equal to or lower than said threshold voltage Vth, and said frequency $f$ being within a range from 10 Hz to 1 KHz, and b. a plurality of Y-drivers connected to said Y-electrodes, respectively, each of which generates an a.c. voltage of the same amplitude V, the same frequency $f$, the same bias voltage as those of said a.c. voltage pluse, respectively and phase $\phi_1$ switchable to another phase $\phi_2$ for time interval $T_2$, said time interval being varied from 0 to $T_1$ corresponding to an image signal, an a.c. bias resulted from the difference between said d.c. voltage generated by said X-driver and said a.c. voltage generated by said Y-driver keeps an excited light-transparent state of said display element and reduces flicker.

6. A electro-optical divice as claimed in claim 5, wherein the phase difference $\phi_1-\phi_2$ between said phase $\phi_1$ and said phase $\phi_2$ is set to be $\pm\pi$.

7. An electro-optical device as claimed in claim 5, wherein said nematic liquid crystal haivng positive dielectric anisotropy consists of only nematic liquid crystal compounds having positive dielectric anisotropy.

8. An electro-optical device as claimed in claim 5, wherein said nematic liquid crystal having positive dielectric anisotropy consists of a nematic liquid crystal compound having positive dielectric anisotropy and a nematic liquid crystal compound having negative dielectric anisotropy.

9. An electro-optical device as claimed in claim 5, wherein said display elements form 7-segment numerics.

* * * * *